United States Patent [19]

Pennington

[11] 4,209,029
[45] Jun. 24, 1980

[54] METHOD OF AND APPARATUS FOR SEALING A LEAK IN A PIPELINE

[75] Inventor: James E. Pennington, Concord, Calif.

[73] Assignee: Team, Inc., Alvin, Tex.

[21] Appl. No.: 859,134

[22] Filed: Dec. 9, 1977

[51] Int. Cl.² .................. F16L 55/18; F16L 55/16
[52] U.S. Cl. .................................. 137/15; 138/99
[58] Field of Search ............... 137/15, 315; 138/99

[56] References Cited

U.S. PATENT DOCUMENTS

| | | | |
|---|---|---|---|
| 1,737,181 | 11/1929 | Woodward | 138/99 |
| 2,703,111 | 3/1955 | Smith | 138/99 |
| 2,951,506 | 9/1960 | Diperstein | 138/99 |
| 3,188,121 | 6/1965 | Cude et al. | 138/99 |
| 3,280,846 | 10/1966 | Anderson et al. | 138/99 |
| 3,650,299 | 3/1972 | Seiler et al. | 138/99 |
| 3,734,112 | 5/1973 | Finney et al. | 137/15 |
| 3,905,396 | 9/1975 | Peterson | 138/99 |
| 4,049,480 | 9/1977 | Kutschke | 138/99 |
| 4,096,886 | 6/1978 | Daspit | 138/99 |

Primary Examiner—Martin P. Schwadron
Assistant Examiner—A. Michael Chambers
Attorney, Agent, or Firm—Guy E. Matthews

[57] ABSTRACT

A method of and apparatus for sealing a leak in a pipeline wherein a leak repair clamp is provided for originally sealing the leak. The clamp includes a body forming a cavity between the pipeline and body for receiving sealant and a passageway through the body for injecting sealant in the cavity. A plug is provided for stoppering the sealant passageway after the sealant has been injected and includes a blind passageway extending through a head portion and into a mounting portion to terminate at a plugging wall. In this manner, the addition of more sealant to the cavity is made possible by drilling through or removing the plugging wall of the plug to place the blind passageway in communication with the sealant passageway.

4 Claims, 4 Drawing Figures

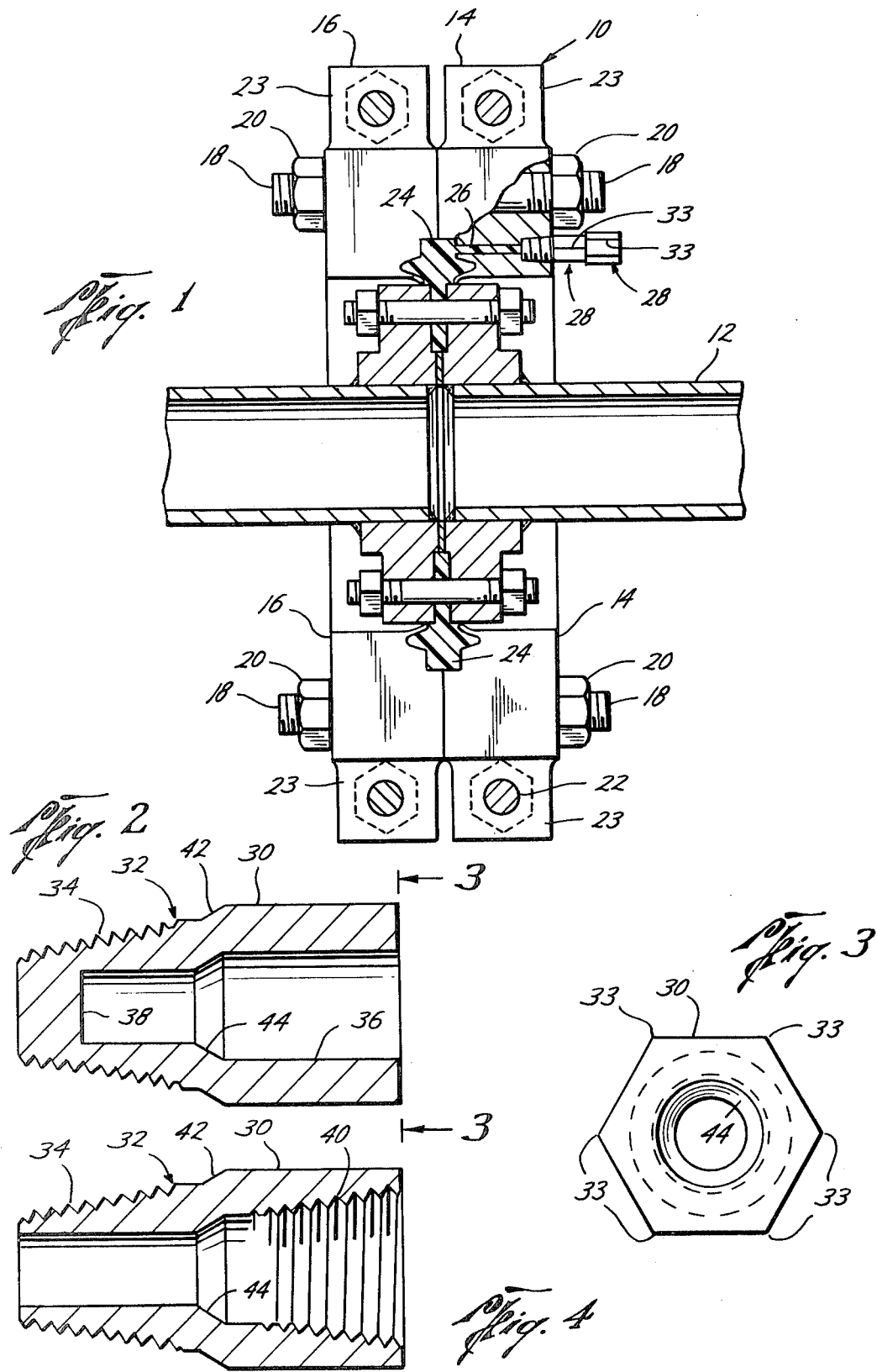

METHOD OF AND APPARATUS FOR SEALING A LEAK IN A PIPELINE

BACKGROUND AND BRIEF SUMMARY OF THE INVENTION

It is well known that leaks in a pipeline are harzardous to the personnel working around the pipeline and wasteful of the material being carried therethrough. Such leaks may occur through the pipe sections, such as straight conduit, elbows and valves, and through the flange joints used to connect the sections to one another.

A recent development in stopping such leaks has been the use of leak repair clamps. Such clamps normally include a body forming a cavity between the pipeline and body for receiving a liquid sealant and a passageway communicating with the cavity for directing the sealant thereto. Thus, the sealant is injected through the sealant passageway into the cavity for originally sealing the leak in the pipeline. A plug is then positioned in the passageway to prevent the sealant from draining or being blown from the clamp and to prevent foreign matter from entering the clamp and polluting the sealant.

Frequently, a leak develops after a leak repair clamp has been positioned about the pipeline. Some reasons such leaks develop in the previously sealed area is that the sealant may become brittle or cracked around the sealed area. Another reason is that the material carried through the pipeline may act as a solvent on the sealant, thereby eroding the seal. If the leak is reopened then it becomes necessary to once again attempt to seal the leak.

Heretofore such second and subsequent attempts required that the clamp be removed, the old sealant scraped away and another clamp and new sealant placed thereon or that a drill and tap procedure be used to drill into the cavity and inject more sealant therein.

One other method is to remove the plug used to stopper the passageway after injection of the original sealant but plug removal is sometimes quite difficult and hazardous because the plug has become attached to the clamp by rust or corrosion; consequently when the plug is removed the material being carried in the pipeline is then free to flow out the sealant passageway, possibly creating health and property hazards. Thus, a problem exists in re-opening the sealant passageway to permit injection of additional sealant into the cavity. After the plug has been removed and the sealant added, the sealant passageway must be restoppered. Thus, care must be taken in removing the plug which requires a substantial amount of time and is quite expensive.

In accordance with the invention a method of and apparatus for sealing a leak in a pipeline which includes a leak repair clamp for sealing a leak in a pipeline. The clamp includes a body forming a cavity for receiving sealant to seal the clamp to the pipeline and a passageway provided in the body that communicates with the cavity for directing sealant thereto. The leak repair clamp is mounted to the pipeline and sealant is injected through the sealant passageway into the cavity to seal the clamp to the pipeline. A plug is mounted with the clamp to stopper the sealant passageway in the clamp, the plug includes a head portion and a mounting portion with threads disposed thereon for threadedly engaging threads within the sealant passageway to stopper the sealant passageway with the plug. A blind passageway extends through the head portion of the plug and into the mounted portion to terminate at a plugging wall. The blind passageway is of sufficient size to permit apparatus access to the plugging wall for drilling therethrough so that more sealant may be added to the cavity without removing the plug from the clamp.

BRIEF DESCRIPTIONS OF THE DRAWINGS

Other objects and advantages of the invention will become apparent upon reading the following detailed description and upon reference to the drawings, in which like reference characters are used throughout to designate like parts:

FIG. 1 is a side elevational view, partly in section, of the apparatus constructed according to the present invention mounted on a pipeline.

FIG. 2 is a side elevational view, partly in section, of a plug constructed according to the present invention used in the embodiment of FIG. 1.

FIG. 3 is a rear elevational view taken in direction of arrows 3—3 of the plug shown in FIG. 2.

FIG. 4 is a side elevational view, partly in section, of the plug shown in FIG. 2 after having been drilled and tapped so that a second plug may by mounted thereto, as shown in FIG. 1.

While the invention will be described in connection with a preferred procedure and embodiment, it will be understood that it is not intended to limit the invention to that procedure and embodiment. On the contrary, it is intended to cover all alternatives, modifications and equivalence as may be included within the spirit and scope of the invention as defined by the appended claims.

DETAILED DESCRIPTION OF THE INVENTION

Turning first to FIG. 1, there is shown a leak repair clamp 10 for sealing a leak in a pipeline 12. Clamp 10 has a body which may be constructed of right and left semi-circular sigments, 14 and 16, which are held together by bolts 18 and nuts 20, or may be constructed of a single semi-circular segment (not shown). These semi-circular sections are then fastened together by nuts and bolts 22 extending through holes in facing tabs 23 disposed on the ends of each semi-circular segment. Clamp 10 has a cavity 24 formed therein facing pipeline 12 for receiving sealant to seal the clamp to the pipeline. A passageway 26 is provided in clamp 10 communicating with cavity 24 for directing sealant to the cavity. Thus, sealant is injected through passageway 26 into cavity 24 for sealing clamp 10 to pipeline 12.

As shown in FIG. 1, a plug 28 is provided to stopper sealant passageway 26 in claim 10. As best seen in FIGS. 2-4, plug 28 has a head portion 30 and a mounting portion 32. Preferably, head portion 30 has a plurality of shoulders 33 disposed about its outer periphery for receiving a torque producing force from a wrench for screwing plug 28 into the sealant passageway 26. Mounting portion 32 has threads 34 disposed thereon for threadably engaging matching threads provided within sealant passageway 26. Preferably, mounting portion 32 is constructed in the shape of a truncated cone, the base of the cone facing head portion 30 and threads 34 being disposed on the outer periphery of the cone.

As best shown in FIG. 2, a blind passageway 36 is provided within each plug 28 and extends through head portion 30 and into mounting portion 34 to terminate at a plugging wall 38. Blind passageway 36 is of sufficient size to permit apparatus access to plugging wall 38 for drilling therethrough, as shown in FIG. 4, so that more sealant may be added to cavity 24 without removing plug 28 from clamp 10. Although the preferred method of removing plugging wall 38 is by drilling, it is to be understood that any method that places blind passageway 36 in communication with sealant passageway 26 without removing plug 28 from clamp 10 by removing plugging wall 38 is acceptable. Preferably, the head portion of the blind passageway 36 has an opening of circular cross section to permit tapping for providing threads 40, as shown in FIG. 4. Threads 40 are provided within a first plug 28 to permit a mounting portion 32 of a second plug 28 to be threadably mounted with the first plug to restopper sealant passageway 26 after having drilled through plugging wall 38, as shown in FIG. 1. More preferred, the head portion of blind passageway 36 has an opening of larger cross-sectional area than the cross-sectional area of the opening through the mounting portion 32.

An intermediate portion 42 of plug 28 is disposed between the head 30 and mounting portion 32 and has a passage disposed therein which communicates with the blind passageway 36. A shoulder 44 is formed within the intermediate passage to taper from the larger cross-sectional area to the smaller area as an aid in guiding the drilling apparatus into contact with plugging wall 38.

It is most preferred that the portion of blind passageway 36 in head portion 30 has a circular cross section with a diameter slightly smaller than the diameter of the top drill recommended for the threads to be tapped so that such portion may be reamed for sizing as an aid in the tapping thereof. Such reaming aids tapping by removing any undesirable material from the passageway, such as corrosion and rust.

In operation, clamp 10 is mounted to pipeline 12, such as to the flange members shown in FIG. 1. Sealant is then injected through sealant passageway 26 into cavity 24 for sealing clamp 10 to pipeline 12. Sealant passageway 26 is stoppered by screwing threads 34 into matching threads within sealant passageway 26 to mount plug 28 to clamp 10. Should a leak later develop at the same location, a hole is drilled through plugging wall 38 to place blind passageway 36 in communication with sealant passageway 26. More sealant is injected through sealant passageway 26 into cavity 24 to again seal clamp 10 to pipeline 12. The head portion of blind passageway 36 is then tapped to provide threads 40 so that a second plug 28 may be screwed into the first plug 28 and thereby restopper sealant passageway 26.

From the foregoing it will be seen that this invention is one well adapted to attain all the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of sealing a leak in a pipeline, comprising the steps of:
   providing a leak repair clamp for sealing the leak in the pipeline, the clamp having a body forming a cavity for receiving sealant and a passageway communicating with the cavity for directing sealant thereto;
   mounting the leak repair clamp with the pipeline to seal the leak;
   injecting sealant through the sealant passageway into the cavity for sealing the clamp to the pipeline;
   providing a blind passageway in a plug, the passageway extending through a head portion and into a mounting portion to terminate at a plugging wall; and
   stoppering the sealant passageway by mounting the plug therein after the sealant has been injected, the addition of more sealant to the cavity being made possible by drilling through the plugging wall of the plug to place the blind passageway in communication with the sealant passageway drilling through the plugging wall of the first plug to place the blind passageway in communication with the sealant passageway;
   injecting sealant through the drilled blind passageway of the plug and through the sealant passageway into the cavity for adding more sealant to the clamp;
   providing a second plug having a blind passageway extending through a head portion and into a mounting portion to terminate at a plugging wall; and
   stoppering the sealant passageway of the clamp by mounting the second plug to the first plug, the addition of more sealant to the cavity being made possible by drilling through the plugging wall to place the blind passageway of the second plug in communication with the sealant passageway.

2. The method of claim 1, including repeating the steps of drilling and injecting to add more sealant to the clamp and providing successive plugs and stoppering the sealant passageway with each successive plug by mounting same to the previous plug.

3. The method of claim 1, wherein the first plug has male threads disposed on the mounting portion for engaging female threads in the sealant passageway and the second plug has male threads on the mounting portion; and including the step of tapping a portion of the blind passageway to provide female threads thereon and the second plug is mounted by threadedly engaging the female threads in the blind passageway of the first plug.

4. The method of claim 3, including the step of reaming the portion of the blind passageway to be tapped prior to tapping for sizing that portion as an aid in tapping.

* * * * *